United States Patent [19]

Kiminkinen

[11] Patent Number: 4,906,925
[45] Date of Patent: Mar. 6, 1990

[54] APPARATUS FOR DETECTING CONDUCTIVE MATERIALS IN A MOVING FLOW

[75] Inventor: Kauko E. K. Kiminkinen, Espoo, Finland

[73] Assignee: Outokumpu Oy, Helsinki, Finland

[21] Appl. No.: 56,304

[22] Filed: Jun. 1, 1987

Related U.S. Application Data

[63] Continuation of Ser. No. 212,975, Dec. 4, 1980, abandoned.

[30] Foreign Application Priority Data

Dec. 5, 1979 [FI]  Finland ................................ 793814

[51] Int. Cl.⁴ ...................... G01N 27/72; G01R 33/12
[52] U.S. Cl. ..................................... 324/228; 324/234; 324/239
[58] Field of Search ................. 324/228, 234, 239, 243

[56] References Cited

U.S. PATENT DOCUMENTS 2,819,447  11/1958  Harmon .............................. 324/236

FOREIGN PATENT DOCUMENTS 573152  11/1945  United Kingdom ................ 324/228
1270821  4/1972  United Kingdom ................ 324/243

Primary Examiner—Reinhard J. Eisenzopf
Assistant Examiner—W. Snow
Attorney, Agent, or Firm—Brooks Haidt Haffner & Delahunty

[57] ABSTRACT

Disclosed is an apparatus for detecting magnetically conductive metals in a flow of material. The apparatus includes a metal casing open at both ends thereof and adopted to receive the material flow therethrough. Magnet bars are attached at two opposite inner walls of the casing in such a manner that, on one side, the north poles are directed inwards into the casing and the south poles are attached magnetically conductively to the casing, and on the other side the polarity of the magnetic bars is opposite, detector means being provided at the two remaining walls of the casing so as to detect the magnetic field at those positions. Finally, electronic circuit elements are connected to the detectors in order to convert the detected magnetic field variations into an observable form. The material flow may take place in a trough positioned within and extending through the casing.

5 Claims, 4 Drawing Sheets

APPARATUS FOR DETECTING CONDUCTIVE MATERIALS IN A MOVING FLOW

This application is a continuation of application Ser. No. 212,975 filed Dec. 4, 1980, abandoned.

BACKGROUND OF THE INVENTION

1. Field of the Invention

The present invention relates to an apparatus for the detection of magnetically conductive metals in a moving flow of material, and of the type comprising a metal casing which is open at its ends and has a substantially square cross section, the material flow passing through said casing.

2. Description of the Prior Art

In metal smelting plants in which the raw material used is nonmagnetic scrap metal, it is often necessary to know whether there are magnetizable metals, such as iron, among the scraps. Iron is often present in a coppered form, and the copper may be diffused into broken and cut surfaces, in which case visual detection is impossible. Finding magnetically conductive metals in a pile of non-magnetic scrap or in a non-magnetic scrap bale with the aid of permanent magnets is a known method, but it is inconvenient, time-consuming, and sometimes even impossible, since permanent magnets must have mechanical contact with the metal pieces to be inspected in order to detect magnetism.

It is also a known method to measure the material to be inspected in a static magnetic field and to use detectors to observe the effect of the pieces present in the material on the magnetic field, i.e., their magnetism.

SUMMARY OF THE INVENTION

The present invention comprises one application of the technique described above, and more precisely, the object of the invention is to provide an apparatus based on the phenomenon of change in the magnetic field, the apparatus being of simple structure and reliable in use and the losses and disturbances in the magnetic field being small in the apparatus.

To achieve this object the invention provides an apparatus, which comprises a metal casing which is open at its ends and has a substantially square cross section, the casing being so positioned that the material flow passes therethrough, bar magnets attached on two opposite inner walls of the casing and directed inwards into the casing in such a manner that on one side of the casing the north poles (N) of the magnet bars are inwards towards the flow of material and the south poles (S) are attached in a magnetically conductive manner to the casing, and on the opposite side the polarity of the magnet bars is reverse, detectors positioned at the two remaining walls of the casing for detecting the magnetic field at those positions, and electronic circuit elements connected in a manner known per se to the detectors in order to convert the magneticfield changes detected by the detectors to an observable form.

The apparatus according to the invention can be used not only for detecting magnetically conductive pieces in scrap metal but also for other applications in which the magnetism of the pieces present in a flow of material or the total degree of magnetism of the flow of material is measured or detected.

The apparatus can be applied to all those cases in which the material to be inspected or measured is magnetically conductive and in the form of one component. If there are several magnetically conductive materials, their combined effect is obtained. The material to be inspected or measured can be transferred into a directed and magnetically closed static constant magnetic field in any manner that is considered best, for example by using a belt conveyor, manually, or by using a machine-filled gutter, pipe, etc. The handling equipment must be of a non-conductive material.

The material to be inspected or measured can be a solution, precipitate, organic compounds, etc., in which there are, or into which there have passed, magnetically conductive metallic elements such as iron, nickel, cobalt, etc.

The apparatus can be used in processes in which it is desired to follow the quantity or passage of a solid magnetically conductive material or the speed of the process and the process residues in the waste. Even low concentrations and small metal particles (metal powders) can be measured, since the apparatus distinguishes, in the volume determined by the directed constant magnetic field, the magnetically conductive particles as a mean of the sums, in which case the error of measurement is small regarding the distribution of the particles. Detectors measure the change in the static constant magnetic field, occurring in this volume, converted by the apparatus electronics to a quantity representing the measurement, the quantity having been calibrated to express the metal to be measured as a percent of the volume. The quantity representing the measurement can also be used for process control.

One example is nickel plants in which nickel is recovered by leaching from converter nickel matte. The leach residue (waste) of the process can contain nickel in three different forms, namely, dissolved in the solution, as a sulfide, and as small metal particles of a few microns. Reliable measuring of the metallic portion by prior techniques is very difficult, timeconsuming and imprecise, since each nickel component contains or is nickel.

Using the apparatus according to the invention, it is possible to determine the nickel directly from the leaching residue. The gutter or belt conveyor is replaced by a pipe made of a nonmagnetic material. The leach residue flows inside the pipe and the measuring detectors express only the metallic nickel particles of the measured volume. The quantity representing the measurement can be converted to a concentration percentage and to a signal which controls the leaching process.

The main characteristics of the invention are given in accompanying claim 1 and its preferred embodiments are given in the sub-claims.

The invention and its other characteristics and details are described below in greater detail in the form of examples and with reference to the accompanying drawings.

DESCRIPTION OF THE PREFERRED EMBODIMENTS

Figure 1:
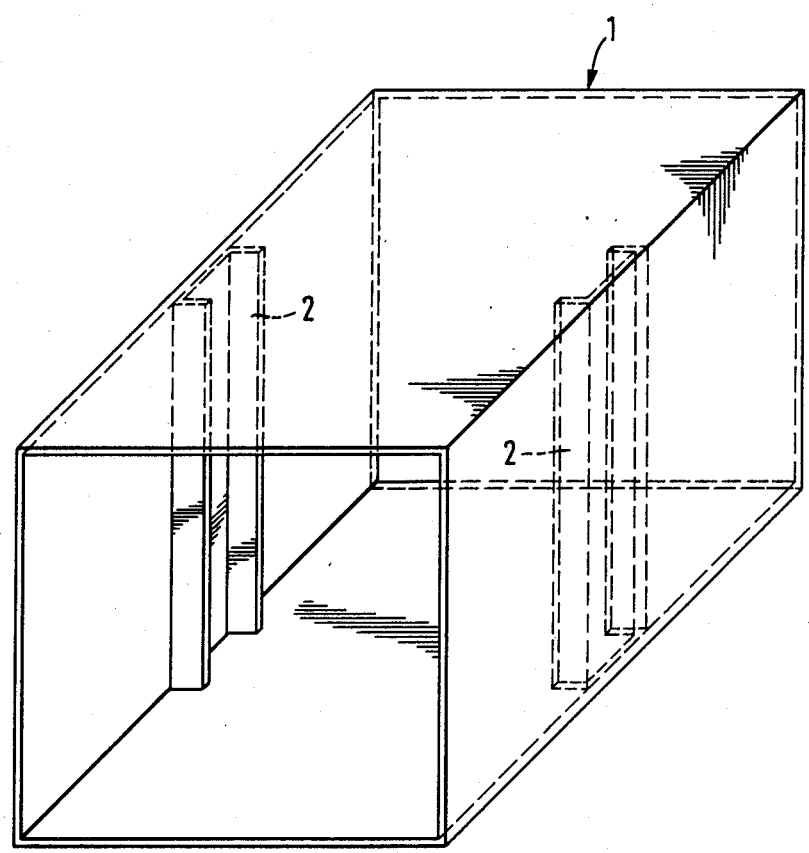
FIG. 1 is a diagrammatic perspective view of the steel casing which constitutes the frame of the apparatus according to the invention.

FIG. 1 shows a steel casing 1, through which the non-magnetic scrap metal to be inspected is passed. The casing is open at its end, and inside it there have been welded on each side, in a vertical position in the middle as seen in the longitudinal direction, U-beams 2 in the manner shown in FIG. 1.

Figure 2:
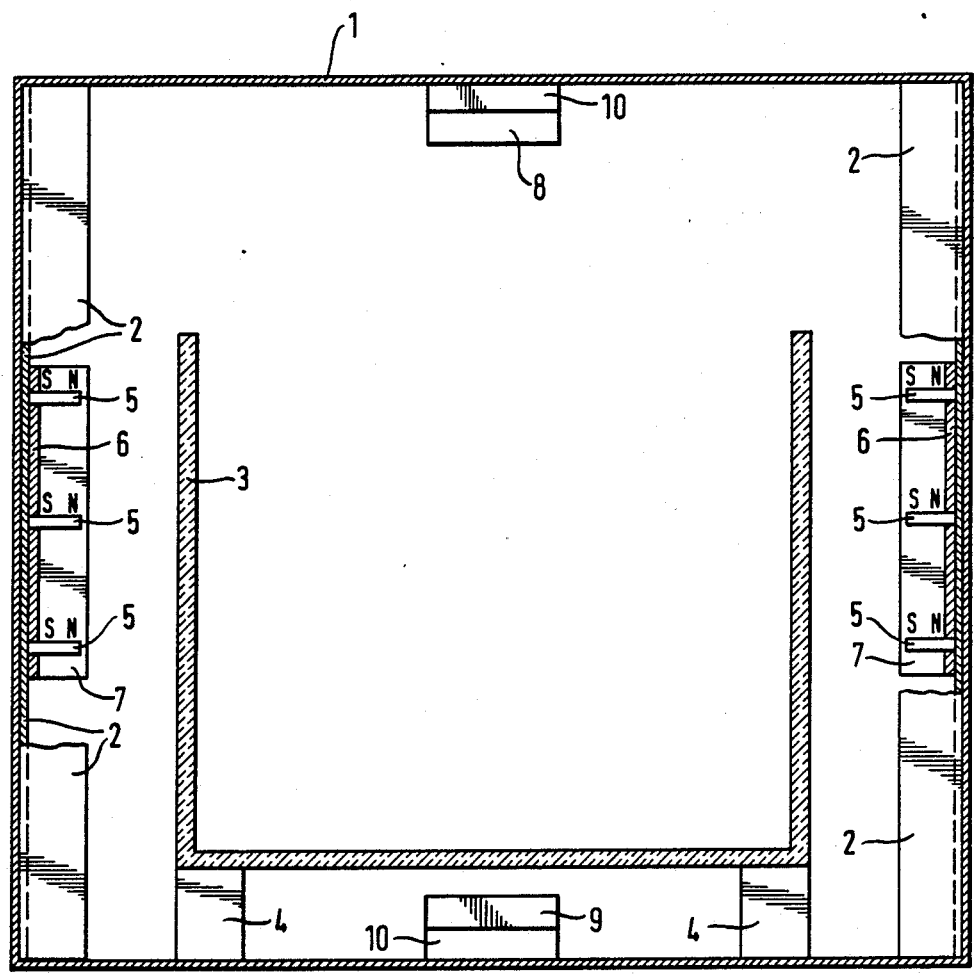
FIG. 2 is a diagrammatic cross section of the apparatus according to the invention.

In FIG. 2, reference numeral 3 indicates a trough 3 made of a non-conductive material. The trough rests via support beams 4 on the floor of the casing 1, and the material to be inspected passes through this trough. The magnetic field is produced by means of bar magnets 5 fitted on both sides of the casing; the position and polarity of the magnets is shown in FIG. 2. A group of bar magnets 5 has been attached to the U-beam 2 by means of a magnet holder box which is made of a non-magnetic material, has been placed inside the U-beam and comprises a base beam 6 made of, for example, steel, and magnet shields 7 situated to the side of the magnet bars. The U-beam serves to direct the magnetic field, and inside the casing there is formed a criss-cross, static constant magnetic field, the strength of which is determined by either permanent magnets or magnets controlled by electric current. In FIG. 2, the north poles (N) of the bar magnets situated on the left side are towards the trough 3, and respectively the south poles (S) of the bar magnets situated on the right side are towards the trough 3. The magnetic circuit is closed via the casing 1.

If non-magnetic scrap metal contains metal pieces which conduct lines of magnetic force, they produce a magnetic field change in accordance with their position and size. This change is measured by harmonic-type (magnetic amplifier) measuring detectors. The measuring detectors 8 and 9, attached to the casing by means of magnetic-radiation shield 10, are, as seen in FIG. 2, positioned parallel to the magnetic field inside the steel casing, above and below the trough 3, at equal distances from the center point of the closed magnetic circuit, so that the magnetic field can be measured on each side of the center point. The direction effect and shape of the piece which conducts lines of magnetic force are eliminated by means of the criss-cross magnetic field.

The magnetic field is attenuated towards the measuring detectors in inverse proportion to the cube of the distance. The change in the magnetic field of a piece causing disturbance is measured by the detectors, and its effect is thus also attenuated in inverse proportion to the cube of the distance, i.e. depending on how far the disturbance-causing piece is from the detector and how great the magnetic field according to the position of the piece is. In this embodiment, the magnetic field strengthens from the detector towards the center point of the steel casing, the measuring sensitivity remaining practically constant in accordance with the changes in the distance.

If, for example, a spherical disturbance-causing piece is detected in the magnetic field, the change can be expressed by the formula:

$$\Delta B = \frac{k \cdot B_r \cdot V}{l^3}$$

where
$\Delta B$ = change in the magnetic field (in tesla)
$k$ = susceptibility (magnetic conductivity)
$B_r$ = position magnetic field of the disturbance-causing piece
$V$ = volume of the disturbance-causing piece (cm$^3$)
$l$ = distance of the disturbance-causing piece from the detector (cm)

The sensitivity of a harmonic-type detector is nowadays about $\pm 10^{-9}$ tesla.

Figure 3:
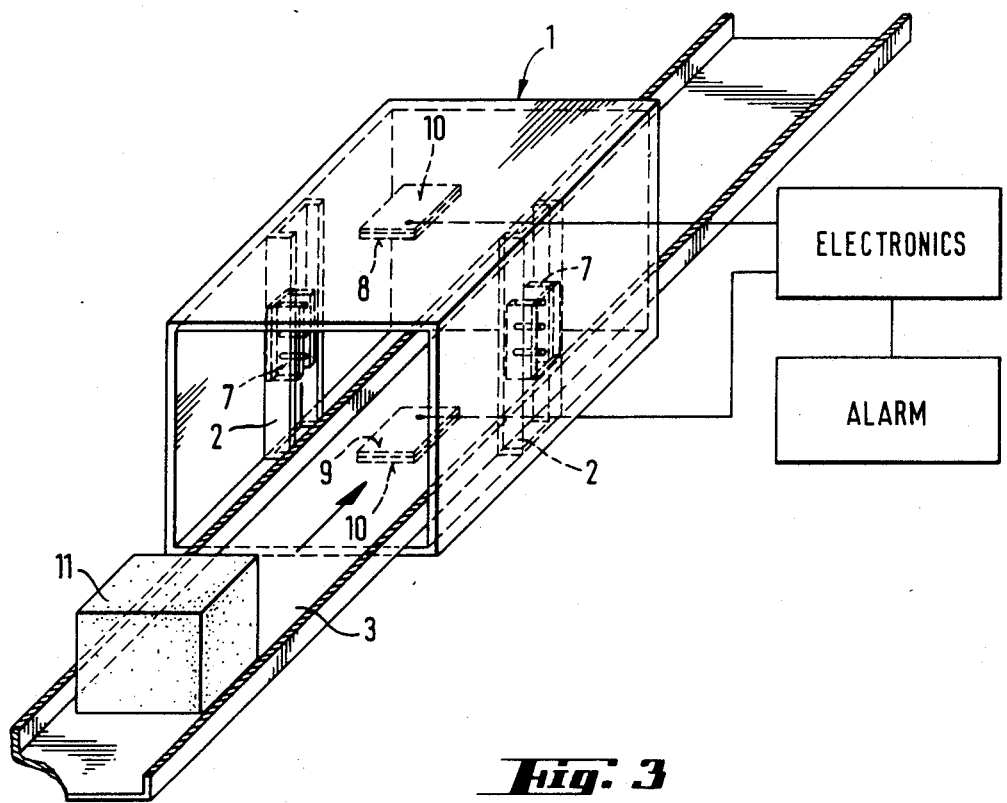
FIG. 3 depicts one embodiment of the apparatus according to the invention.

FIG. 3 depicts one embodiment of the apparatus according to the invention. In this embodiment the material to be inspected is in particle form and is conveyed by means of a belt conveyor through the casing 1. The electronics of the apparatus is coupled to the detectors, and the electronics gives an alarm in accordance with the selected threshold values. In this figure the base beam and the magnets 5 are omitted for greater clarity.

Figure 4:
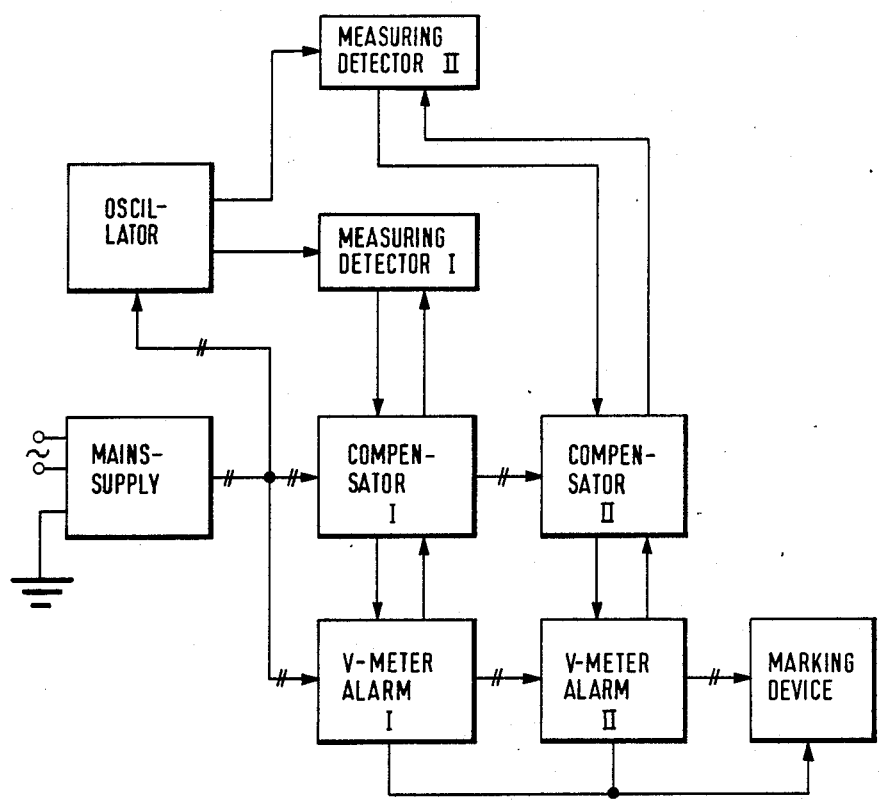
FIG. 4 depicts, in the form of a block diagram, the electronics of the apparatus according to the invention.

The electronics of the apparatus shown in FIG. 2 or 3 can be, for example, as shown in the block diagram of FIG. 4. The detectors serve as magnetic amplifiers and the change is expressed as an electric quantity. The change in the magnetic field according to the position within the casing, which affects the detectors, is eliminated by electrical compensation by means of compensators 1 and 2. This compensation is carried out when the trough or belt conveyor is empty. The measuring device is at this time in the 0-position and remains there even though the apparatus is working with non-magnetic scrap metal.

In the block diagram depicted, the indicators are voltmeters 1 and 2, which can be coupled to give an alarm when a predetermined threshold value is surpassed. The point of disturbance detected in the scrap is marked with, for example, a dye either automatically or by using a manually controlled marking device. Thereafter, the metal scrap which has caused the disturbance is removed by a method which is considered best.

The apparatus according to the invention can be used for continuous control of scrap metal passing in smelting plants to the smelting furnaces, and thereby to prevent scrap metal which conducts lines of magnetic force and has a detrimental effect on the smelted metal from entering the smelting process. Thus waste smelting and casting can be prevented, and cleaning processes of smelting furnaces can be eliminated.

In one example case, an apparatus according to the invention, calibrated by experimental measurements, was used for detecting nickel in a leach residue having a total nickel content of 23.3% Ni and a content of undissolved metallic nickel of 3.3%. It was possible to detect this undissolved nickel amount by the apparatus.

What is claimed is:

1. An apparatus for detecting magnetically conductive metals in a moving flow of materials, the apparatus comprising
a metal casing which is open at its ends and has a substantially square cross section, with two opposite sides of said casing comprising beams of U-shaped cross section, side flanges of each of said beams of U-shaped cross section extending inwardly towards said flanges of an opposed beam, the casing being so positioned that the material flow passes therethrough;
straight bar magnets attached to a base of each of said beams, between the flanges thereof on two opposite inner walls of the casing and directed inwards into the casing in such a manner that on one side of the casing the north poles (N) of the magnet bars are inwards towards the flow of material and the south poles (S) are attached to and in magnetically conductive contact with the casing, and on the opposite side the polarity of the magnet bars is reverse for producing a transverse, static, constant magnetic field within the casing;

detectors positioned at the two remaining walls of the casing essentially parallel to the static magnetic field inside the casing for detecting the magnetic field of those positions and for generating electrical signals in response to the magnetic field within the casing, and electronic circuit elements connected to the detectors in order to convert the signals generated by the detectors to a readable display of information.

2. An apparatus according to claim 1, wherein inside the metallic casing there is provided a trough means, made of a non-magnetic material, in which the flow of material travels, the magnet bars being situated outside the sides of the trough means and the detectors above and respectively below the trough means.

3. An apparatus according to claim 1, wherein the ends of the magnet bars are attached to the U-beam by means of a steel beam common to a group of the bars.

4. An apparatus according to claim 1, wherein magnetic shields are provided on both sides of the casing on the sides of the magnet bars.

5. An apparatus according to claim 1, wherein the detectors are mounted on the casing by means of magnetic shields and magnetically insulated from the casing.

* * * * *

UNITED STATES PATENT AND TRADEMARK OFFICE
CERTIFICATE OF CORRECTION

PATENT NO. : 4,906,925
DATED : March 6, 1990
INVENTOR(S) : Kauko E.K. Kiminkinen It is certified that error appears in the above-identified patent and that said Letters Patent is hereby corrected as shown below:

Column 3:

line 23, the words "criss-cross" should be deleted.

line 24, after "field" --extending transversely across the casing interior-- has been omitted.

Signed and Sealed this

Second Day of April, 1991

Attest:

HARRY F. MANBECK, JR.

Attesting Officer      Commissioner of Patents and Trademarks